United States Patent [19]

Todaro

[11] 3,910,586

[45] Oct. 7, 1975

[54] PACKING FOR VALVE STEMS USED IN INTERNAL COMBUSTION ENGINES

[75] Inventor: Salvador Todaro, Buenos Aires, Argentina

[73] Assignee: Salvador Todaro Y Hermano, Argentina

[22] Filed: Jan. 4, 1974

[21] Appl. No.: 430,882

[30] Foreign Application Priority Data

Jan. 10, 1973 Argentina .............................. 246080

[52] U.S. Cl. ..................... 277/48; 277/51; 277/182; 277/189; 123/188 P
[51] Int. Cl.² .......................................... F16J 15/00
[58] Field of Search ............... 277/51, 48, 182, 189; 123/188 P

[56] References Cited
UNITED STATES PATENTS

| 2,191,873 | 2/1940 | Victor | 277/51 X |
| 3,333,578 | 8/1967 | Muller | 123/188 P |
| 3,480,286 | 11/1969 | Kosatka | 277/182 |
| 3,599,992 | 8/1971 | Kammeraad | 277/48 |

Primary Examiner—Samuel B. Rothberg
Attorney, Agent, or Firm—McGlew and Tuttle

[57] ABSTRACT

A valve stem box comprising an outer casing of a rigid material having an entrance end with an opening and an opposite end with an inturned flange having an opening of a diameter comparable to the valve stem. A lining of an elastomeric material is positioned in the casing and it has a flange on its inner end. A gasket member includes a radially extending outer flange portion which is held by the two washers on the flange of the lining and it also includes a frusto-conical portion terminating near the casing opening in an opening of a diameter substantially equal to the stem diameter. It is reinforced by an encircling spring disposed therearound.

4 Claims, 2 Drawing Figures

PACKING FOR VALVE STEMS USED IN INTERNAL COMBUSTION ENGINES

BACKGROUND OF THE INVENTION

1. FIELD OF THE INVENTION

This invention relates in general to the construction of packings for valves and, in particular, to a new and useful packing for valve stems used in internal combustion engines which includes a substantially cylindrical rigid casing which is fully opened at its entrance end and has an opposite end with an inturned flange, and includes an elastic material lining having an outwardly flaring bevel at its entrance end and spaced from the casing flange at its other end with an elastomeric bell-shaped gasket having a radially extending outer flange overlying the lining flange and an inner frustoconical wall having an opening with a diameter substantially the same as the valve stem diameter for the passage of the valve stem, the gasket being held between two metal washers on the flange of the lining and being reinforced at the central opening defined in the flange of the casing by an annular spring.

2. DESCRIPTION OF THE PRIOR ART

Part of the lubricating oil of an internal combustion engine which goes to the valve stems and guides becomes lost after the wear of the parts of the engine and such losses can be avoided only by providing adequate packings for the valve stems. It is for this reason that elastomeric packings have been employed which serve to prevent such losses by effecting a close fit between the elastomeric packings and the associated valve guides with the stems. Over the years, various improvements in such packings have been made, and these packings are usually provided with rigid casings in order to protect the inner elastomeric parts. A disadvantage in the known construction is that they are of complex and expensive configuration, and they become subject to difficulties in their operation.

SUMMARY OF THE INVENTION

In accordance with the present invention, there is provided an improved packing which includes a rigid substantially cylindrical outer casing having an entrance end which is fully opened and an opposite end which includes an inturned flange having a smaller diameter opening comparable to the diameter of the valve stem which is to pass therethrough. The construction includes a lining or sleeve of elastomeric material which is tightly fitted within the casing and provided with a wedging bevel at its entrance end aligned with the entrance end of the casing, and with an inturned flange formation at its opposite end which is spaced from the casing flange. The flange of the lining serves as a seat for a bell-shaped gasket having a radially extending outer flange portion which is secured between two rigid washers, which are preferably made of a metal material. The metal washers are retained adjacent the opposite end of the casing below the casing flange by suitable holding means, for example, by an angle formation of one of the washers, or by the forming of the casing with a portion of smaller diameter adjacent the inturned flange and which defines a holding seat against which the washer is positioned. The bell-shaped gasket includes a frusto-conical inner portion which extends toward the flanged end of the casing and terminates in an opening of a diameter which is substantially equal to the diameter of the valve stem so that it closely embraces the valve stem. The gasket is reinforced and adjusted by means of an annular spring positioned between the opened end of the frusto-conical portion and the flange of the casing.

Accordingly, it is an object of the invention to provide an improved packing for valve stems which comprises a frustoconical gasket disposed in an outer casing adjacent a flanged end thereof having an opening for the valve stem and which is supported on a flange of a casing liner and is reinforced by an encircling spring ring adjacent the casing opening.

A further object of the invention is to provide a valve stem packing which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DESCRIPTION OF THE PREFERRED EMBODIMENTS

Figure 1:
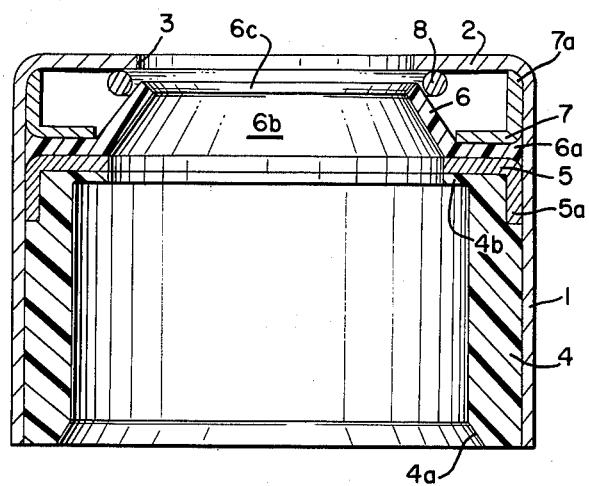
FIG. 1 is a vertical sectional view of an improved packing constructed in accordance with the invention.

Referring to the drawing in particular, the invention embodied therein, comprises a valve stem packing which comprises a substantially cylindrical casing 1, having a fully opened entrance end and an opposite end, with an inturned casing flange 2, having a central orifice 3, of a diameter which is somewhat greater than the diameter of the valve stem (not shown), which is adapted to traverse this opening. The casing 1 is preferably made of a metal material, normally a steel plate material.

An elastomeric ring or lining 4 made of a silicone material is lodged inside the casing 1 and is provided with a bore having an outwardly flaring bevelled end 4a at the entrance end of the casing 1. The opposite end of the lining 4 is provided with an inturned flange portion 4b, which serves as a set for a metal washer 5. The elastomeric ring is preferably provided with an outer annular recess adjacent its opposite end, in which is fitted a peripheral flange 5a of a metal washer 5, so that the washer 5 is firmly placed on the edge of the flange 4b of the elastomeric ring.

A bell-shaped gasket 6 of elastomeric material, for example of a Teflon material, is provided with an outer flange portion 6a which is seated on the washer 5 and is retained in its correct position by another metal washer 7. Holding means are provided for holding the metal washer 7 at a spaced location from flange 2 of the casing and in firm seated engagement against gasket 6 and in the embodiment of FIG. 1, this comprises the angle portion 7a of washer 7 which is directed upwardly against the interior of flange 2. The parallel radially extending parts of the two washers 5 and 7 retain the flange portion 6a of gasket 6 under pressure. The bell-shaped gasket 6 includes a central portion 6b of frustoconical configuration which terminates in a small diameter opening 6c of a size comparable to the diameter of the valve stem which is to be embraced thereby. The opening 6c is somewhat smaller than the diameter of the orifice 3.

The arrangement includes reinforcement means for reinforcing the inner edge of packing 6 and in the embodiment shown, this comprises an annular spring 8 which surrounds the edge below flange 2 and maintains the desired close fit.

Figure 2:
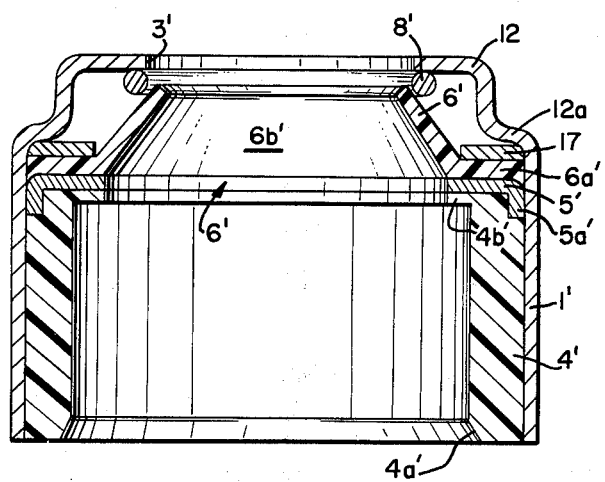
FIG. 2 is a view, similar to FIG. 1, of another embodiment of the invention.

In the embodiment shown in FIG. 2, there is provided a packing which includes a casing 1' which has an opened end and an opposite end of reduced diameter 12. The reduction in diameter forms a shoulder 12a between the two diameter portions which constitute the holding means for holding washer 17 in compressive engagement with flange portion 6a' of gasket 6'. The other parts of the packing have been designated with similar numerals to that of the first embodiment but with a prime added.

In practice, it has been found that steel plates serve very well for casing 1 and casing 1', and for washers 5, 7 and 17, but it is also possible to replace these parts by other similarly rigid materials of suitable characteristics and which is not necessarily of metal material.

While specific embodiments of the invention have been shown and described in detail to illustrate the application of the principles of the invention, it will be understood that the invention may be embodied otherwise without departing from such principles.

What is claimed is:

1. A packing for valve stems used in internal combustion engines, comprising a substantially cylindrical rigid casing having a fully opened entrance end and an opposite end with an internal flange having a central opening of a diameter slightly larger than the valve stem diameter, a tubular lining of elastic material located within and coextensive said casing and having a bore with an outwardly flared bevel at an end thereof adjacent the entrance end of said casing and an opposite end with an inwardly extending flange, an elastomeric bell-shaped annular gasket having a radially extending outer flange overlying said lining flange and an inner frusto-conical wall portion extending inwardly from said outer flange toward the central opening and having an opening in a relaxed state substantially of the same diameter as the diameter of the valve stem and slightly smaller than the central opening of said casing, a first washer between said gasket flange and said lining flange, a second washer spaced from said casing flange and located in juxtaposition with said gasket flange, holding means between said casing flange and said second washer for holding said second washer against said gasket flange to hold said gasket flange and said first washer against said liner, and an annular spring disposed between said gasket frusto conical wall portion and said casing flange and reinforcing gasket.

2. A packing for valve stems used in internal combustion engines, according to claim 1, wherein said holding means comprises an angle portion of said second washer extending from said second washer along the wall of said casing into engagement below said casing flange.

3. A packing for valve stems used in internal combustion engines, according to claim 1, wherein each of said first and second washers include axially extending flange portions, said axially extending flange portion of said first washer comprising said holding means, the flange of said second washer extending into an annular groove defined on said lining.

4. A packing for valve stems used in internal combustion engines, according to claim 1, wherein said holding means comprises a ledge of said casing, said casing having a portion of reduced diameter adjacent said opposite end forming said ledge, said second washer being in engagement with said ledge.

\* \* \* \* \*